Patented Apr. 30, 1946

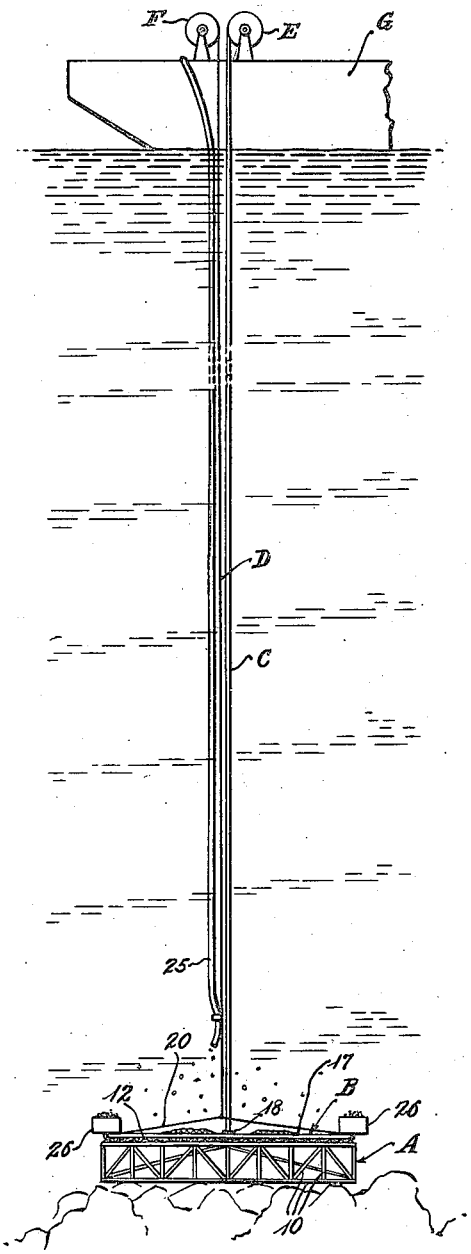
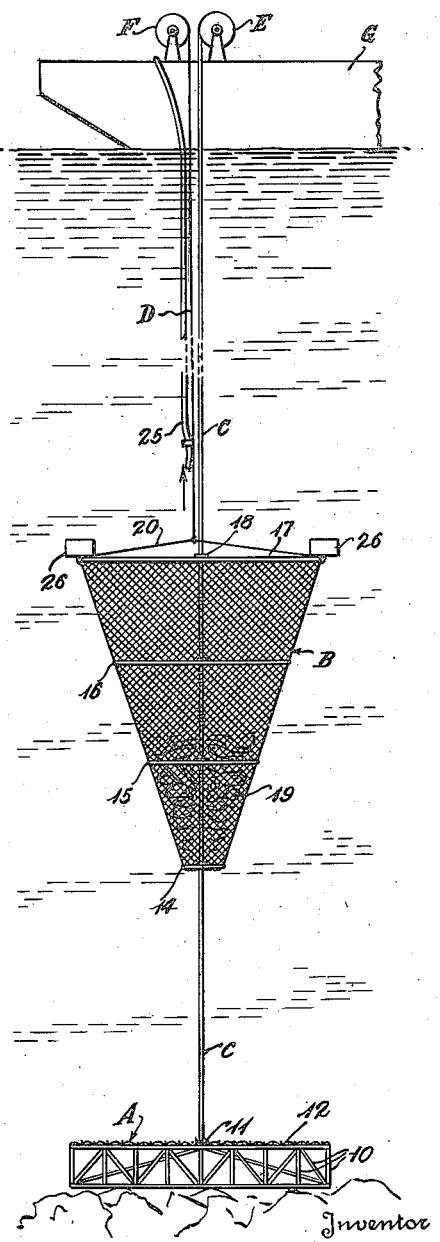

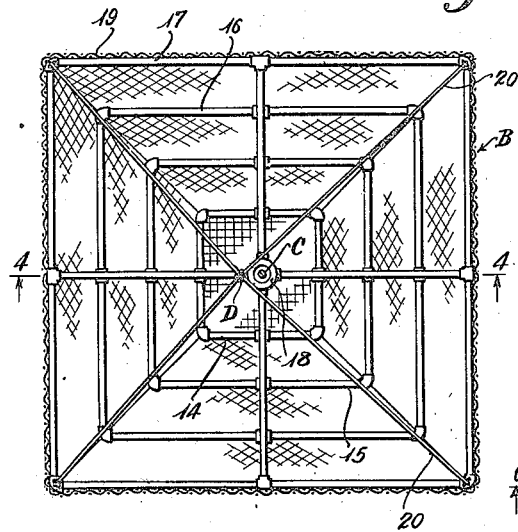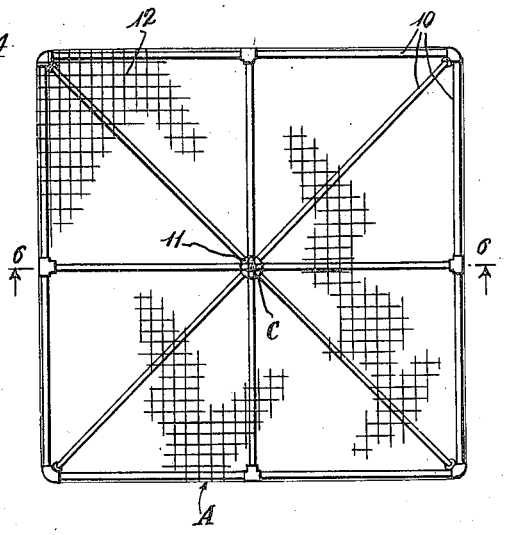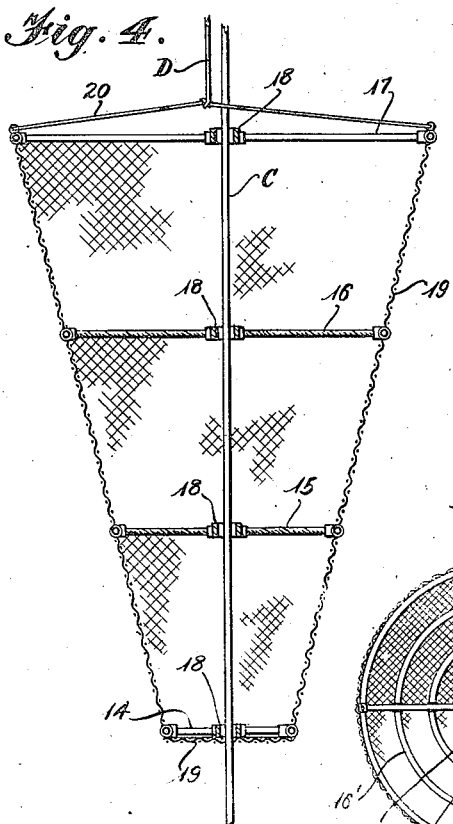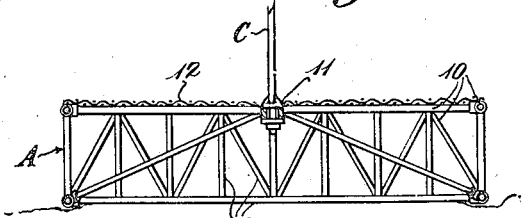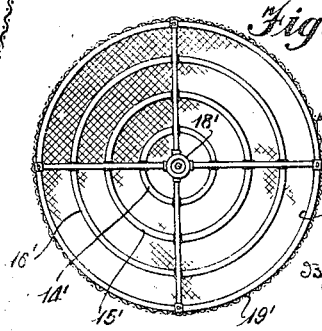

2,399,193

UNITED STATES PATENT OFFICE 2,399,193

FISHING TRAP AND METHOD

Sheldon H. Allen, Gretna, La.

Application June 14, 1944, Serial No. 540,335

9 Claims. (Cl. 43—12)

The invention relates to an improved fishing trap or net and an improved method of fishing. In accordance with my invention the trap or net comprises a plurality of rigid frames of different sizes connected by a network of foraminous material covering the sides and bottom, but leaving the top of the net open, the largest frame being at the top and the smallest at the bottom. The net is adapted to be lowered to the bottom over a suitable guide member extending from the surface of the water to an anchoring member on the fishing bottom, and when the net or trap reaches the bottom the frames are collapsed one upon another like an accordion to form a flat body resting upon the bottom surface and occupying a minimum space, as well as being practically invisible to the fish. The fish may be attracted to the vicinity of the trap by baiting or other suitable means, and at the proper time the trap is raised from the bottom and drawn to the surface along the guide member, carrying therewith the fish.

In accordance with the preferred embodiment of my invention the trap when collapsed rests upon a framework or platform which serves to protect the net against sharp rocks or coral on the fishing bottom, and which by its construction is also adapted to serve as an anchor for holding the equipment in a definite position with reference to the surface vessel.

The invention will be more readily understood by reference to the accompanying drawings, in which:

Fig. 1 is a diagrammatic view showing the trap or net controlled from a surface vessel, and resting upon the supporting platform in collapsed position;

Fig. 2 is a similar diagrammatic view illustrating the trap as it is being drawn to the surface;

Fig. 3 is a top plan view on a larger scale than shown in Figs. 1 and 2 illustrating the net or trap;

Fig. 4 is a section on the line 4—4 of Fig. 3;

Fig. 5 is a top plan view of the trap supporting platform or anchor;

Fig. 6 is a section on the line 6—6 of Fig. 5;

Fig. 7 is a view showing an alternative form of weight or anchor; and

Fig. 8 is a plan view similar to Fig. 3 but on a reduced scale, and illustrating a net of circular cross section.

Referring first to the diagrammatic Figures 1 and 2, A denotes a suitable platform or weight which is adapted to be let down to the fishing bottom, and B indicates the fishing trap or net which, when let down to the bottom so as to rest upon the platform A, will collapse like an accordion. The weight or platform A is adapted to be controlled by means of a line C which extends from the weight to the surface vessel, and which also serves as a guide along which the trap B is raised or lowered. The trap B is adapted to be actuated by a line D connected by a suitable halter at the top of the trap and controlled from the surface vessel. Suitable winches E and F on the vessel G may be employed for raising and lowering the weight A and trap B.

The platform A performs three functions: (1) as a support or protection for the net when in collapsed position; (2) as an anchor for retaining the fishing assembly in position; and (3) as a bottom connection for the guide line C. As shown the platform comprises a framework of interconnected pipes 10 extending vertically, horizontally and diagonally so as to form a strong but relatively light framework which readily anchors itself to the fishing bottom whether the bottom be sandy or composed of rocks, coral, and the like. At the center of the top frame of the platform there is located a tie point 11 for attachment of the hoist line or guide member C. Preferably a wire or like covering 12 is provided over the top of the platform which is adapted to serve as a protection for the net, and which is suitably reticulated so as to permit water to readily pass therethrough.

The net or trap B comprises a series of frames herein shown as four in number and represented by the numerals 14, 15, 16 and 17, the lowest frame member being the smallest in size and the others progressively larger. Preferably the four frames may be composed of interconnected pipes and each frame is provided with a center bearing member or eye 18 which is suitably supported from the outside portion of the frame. In the two frame members 14 and 17 the eye members may be connected to the outer portions of the frame by means of spokes composed of pipe, whereas in the two intermediate frame members 15 and 16 the outer portions of the frame are connected to the center hub or eye 18 by means of rope spokes. The frames are interconnected by cotton webbing or the like 19, such as is commonly used in the making of fishing nets, and this webbing extends also over the bottom of the net, leaving the top open. While the sides of the frame members are shown as straight they may be circular if desired, as illustrated in Fig. 8.

The hoist line D is connected to the outer extremities of the upper frame 17 of the net by means of a suitable halter or bridle composed of divergent lines 20.

In operation the weight A is first lowered to the bottom by means of the line C, and is held exactly in such position by reason of the interconnected pipes of which the platform is composed. Thus the fishing apparatus will be anchored in a definite position. The fish trap, which has been threaded over the line C, is then let down to the bottom by means of the hoist line D until its bottom contacts the top of the platform A, after which the net folds up like an accordion and lies flat upon the paltform. The fish may then be attracted over the folded net either by bait 26 secured to the trap, or by loose bait which may be dispensed over the net from a surface-controlled bait dispenser or hose 25.

At a particular moment determined either by experience or by observation the net B may be raised by operation of the hoist line D, thereby entrapping fish within the net. The size of the net and the speed with which it is raised to a large extent determines the percentage of available fish that are captured.

While the form of anchor or weight shown in Figs. 5 and 6 is that preferred, nevertheless within the broad scope of the invention any suitable anchoring means may be employed for holding the line C in position and for providing a platform or support for the net. A simpler form of weight is shown in Fig. 7.

The invention has been described in detail for the purpose of illustration, but it will be obvious that numerous modifications and variations may be resorted to without departing from the spirit of the invention. Thus, while the net in Figs. 1 to 4 has been shown as formed with frames composed of pipe sections using straight pipes in their construction, frames 14', 15', 16' and 17' of circular form may be readily employed, as shown in Fig. 8, and for many purposes this arrangement has been found equally efficient as the form shown. Likewise, any suitable means for baiting or observing the fish may may employed in connection with the present system.

It will be noted that the diameter of the top of the net and the speed with which the net is raised will determine to a large extent the percentage of available fish that will be captured. Thus a wide-mouthed net and rapid lifting of the net are desirable features.

I claim:

1. Fishing equipment comprising a collapsible net including a plurality of superposed frames of different sizes, a reticulated network covering the sides and bottom of the net, leaving the top open, and a center guide line over which the net is adapted to be raised and lowered, the bottom having a central opening to permit passage of the guide line therethrough.

2. A collapsible net including a large rigid frame at the mouth of the net, and a smaller frame at the bottom of the net, center bearings supported by said frames, and network covering the sides and bottom of the net leaving the top open, in combination with a fixed vertical guide line passing through said center bearing, and means for raising and lowering the net along the guide line.

3. A collapsible net including a large rigid frame at the mouth of the net, and a smaller frame at the bottom of the net, center bearings supported by said frames, and network covering the sides and bottom of the net leaving the top open, in combination with a fixed vertical guide line passing through said center bearings, means for raising and lowering the net along the guide line, and a bottom support on which the net is adapted to lie flat when the net is in lowered position.

4. A collapsible net including a wide mouth having a supporting frame to maintain the mouth open, a tapered body of reticulated fabric, and spaced bearings or eyes along the center axis of the net, in combination with a fixed vertical guide line extending through the center bearings, and means for raising or lowering the net along said guide line.

5. In combination with a net and guide line as set forth in claim 4, a supporting platform for the net when in collapsed position, said platform being secured to the lower end of the guide line and serving as an anchoring means therefor.

6. A method of fishing which comprises lowering a collapsible net downwardly below the surface of a body of water through a predetermined, substanatially fixed path, said path having as its extremities the bottom of the body of water and a surface vessel, causing the net to collapse at the end of its downward movement, luring fish to the area bounded by the edge of the collapsed net, raising the net to an entrapping position, and then withdrawing the net from the water over substantially the same predetermined path, said lowering and withdrawing movements occurring while the net is centrally guided.

7. Fishing equipment comprising a weighted anchor member adapted to be lowered to the bottom of a body of water, a surface vessel, a guide line connecting the anchor member and the surface vessel, and a collapsible net having means slidably connecting the same to said guide line, and means for raising and lowering the net along said guide line.

8. A collapsible net including a mouth portion having a rigid supporting frame to maintain the mouth open, a body portion of reticulated fabric, and spaced bearings or eyes along the center axis of the net, in combination with a vertical guide line extending through the center bearings, and means for raising or lowering the net along said guide line.

9. A collapsible net including a rigid frame at the mouth of the net, another frame at the bottom of the net, center bearings supported by said frames, a reticulated body covering the sides and bottom of the net leaving the bottom open, in combination with a taut vertical guide line passing through the center bearings and means for raising and lowering the net along the guide line.

SHELDON H. ALLEN.